(12) United States Patent
Stewart

(10) Patent No.: US 11,573,415 B2
(45) Date of Patent: Feb. 7, 2023

(54) DEVICE, SYSTEM, AND METHOD FOR CHANGING ANGLE OF INCIDENCE OF A FILTER OR FILTER WHEEL

(71) Applicant: RareCyte, Inc., Seattle, WA (US)

(72) Inventor: David Stewart, Seattle, WA (US)

(73) Assignee: RareCyte, Inc., Seattle, WA (US)

( * ) Notice: Subject to any disclaimer, the term of this patent is extended or adjusted under 35 U.S.C. 154(b) by 293 days.

(21) Appl. No.: 16/925,909

(22) Filed: Jul. 10, 2020

(65) Prior Publication Data

US 2021/0011277 A1 Jan. 14, 2021

Related U.S. Application Data

(60) Provisional application No. 62/873,390, filed on Jul. 12, 2019.

(51) Int. Cl.
G02B 26/00 (2006.01)
G02B 21/24 (2006.01)
G02B 21/00 (2006.01)

(52) U.S. Cl.
CPC ....... *G02B 26/008* (2013.01); *G02B 21/0076* (2013.01); *G02B 21/24* (2013.01)

(58) Field of Classification Search
CPC ... G02B 26/008; G02B 21/0076; G02B 21/24
USPC ......................................................... 359/892
See application file for complete search history.

(56) References Cited

U.S. PATENT DOCUMENTS

| | | | |
|---|---|---|---|
| 3,447,873 A | 6/1969 | Ashlet et al. | |
| 4,176,916 A | 12/1979 | Carpenter | |
| 4,363,967 A * | 12/1982 | Efkeman ............... | G01J 5/0014 |
| | | | 250/338.5 |
| 4,653,902 A | 3/1987 | Hester | |
| 5,506,731 A | 4/1996 | Smiley | |
| 6,452,732 B1 | 9/2002 | Okada et al. | |
| 9,239,443 B2 | 1/2016 | Belgum et al. | |
| 2010/0157247 A1 | 6/2010 | Grover et al. | |

* cited by examiner

*Primary Examiner* — Marin Pichler
*Assistant Examiner* — Mitchell T Oestreich
(74) *Attorney, Agent, or Firm* — Shay Glenn LLP

(57) ABSTRACT

This disclosure is directed to a system and method for changing an angle of incidence of a filter or filter wheel.

15 Claims, 17 Drawing Sheets

DEVICE, SYSTEM, AND METHOD FOR CHANGING ANGLE OF INCIDENCE OF A FILTER OR FILTER WHEEL

CROSS-REFERENCE TO RELATED APPLICATIONS

This application claims the benefit of U.S. Provisional Application No. 62/873,390, filed Jul. 12, 2019, which is herein incorporated by reference in its entirety.

INCORPORATION BY REFERENCE

All publications and patent applications mentioned in this specification are herein incorporated by reference to the same extent as if each individual publication or patent application was specifically and individually indicated to be incorporated by reference.

FIELD

This disclosure relates generally to a spectrum selector, though more specifically, to a device or system for changing an angle of incidence of a filter or filter wheel.

BACKGROUND

Samples often include materials of interest that are to be imaged for analysis. These materials of interest may include a plurality of biomarkers and/or components for which it may be desirous to detect and image. Current filters and imaging apparatuses may only permit for a limited number of labels to be used at any one given time. As a result, practitioners, researchers, and those working with suspensions continue to seek systems and methods to more efficiently and accurately image samples.

DETAILED DESCRIPTION

Figure 1A:
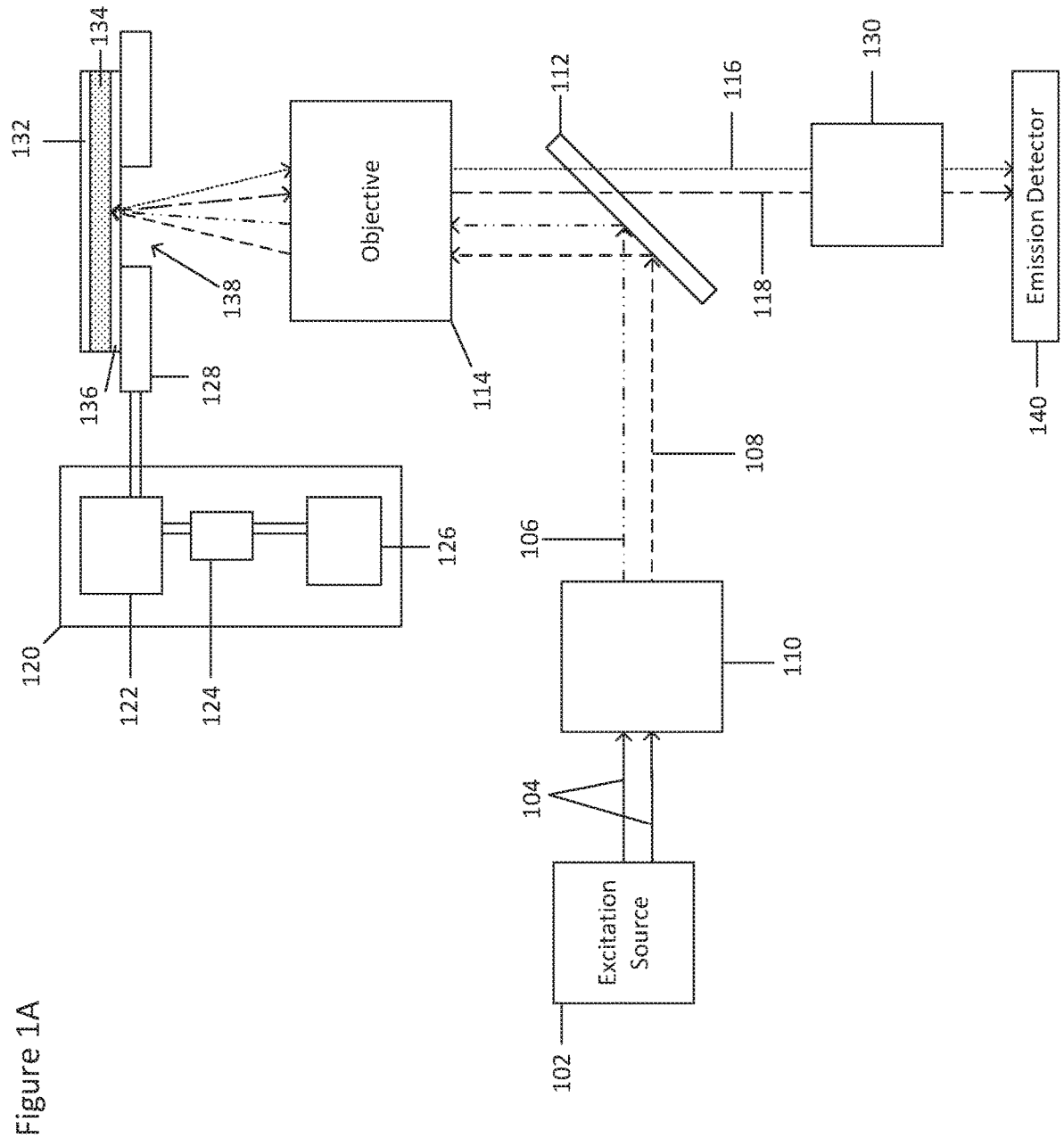
FIG. 1A shows an example optical path of a fluorescent microscope.

This disclosure is directed to a system and method for changing an angle of incidence of a filter or filter wheel.

In the following descriptions, the term "light" is used to describe various uses and aspects of multiplexing and imaging. The term light is not intended to be limited to describing electromagnetic radiation in the visible portion of the electromagnetic spectrum, but is also intended to describe radiation in the ultraviolet and infrared portions of the electromagnetic spectrum.

In the following descriptions, the term "sample" is used to describe a biological fluid, a biological semi-solid, a biological solid (which may remain solid, such as tissue, or may be liquefied in any appropriate manner), a suspension, a portion of the suspension, a component of the suspension, or the like. For example, for anticoagulated whole blood, the sample is the anticoagulated whole blood (i.e. a suspension), the buffy coat (i.e. a portion of the suspension), or a circulating tumor cell (i.e. a component of the suspension). For the sake of convenience, the sample referenced is whole blood, though it should be understood that the method and system described and discussed herein is used with any appropriate sample, such as urine, blood, bone marrow, buffy coat, cystic fluid, ascites fluid, stool, semen, cerebrospinal fluid, nipple aspirate fluid, saliva, amniotic fluid, mucus membrane secretions, aqueous humor, vitreous humor, vomit, vaginal fluid, and any other physiological fluid or semi-solid. For example, the sample is a tissue sample or a material from adipose tissue, an adrenal gland, bone marrow, a breast, a caudate, a cerebellum, a cerebral cortex, a cervix, a uterus, a colon, an endometrium, an esophagus, a fallopian tube, a heart muscle, a hippocampus, a hypothalamus, a kidney, a liver, a lung, a lymph node, an ovary, a pancreas, a pituitary gland, a prostate, a salivary gland, a skeletal muscle, skin, a small intestine, a large intestine, a spleen, a stomach, a testicle, a thyroid gland, or a bladder.

In the following descriptions, the terms "target analyte" or "target material" are used to describe a biological material of interest. It should also be understood that the target analyte can be a fraction of a sample, such as buffy coat, a cell, such as ova, fetal material (such as trophoblasts, nucleated red blood cells, fetal red blood cells, fetal white blood cells, fetal DNA, fetal RNA, or the like), a circulating tumor cell ("CTC"), a circulating endothelial cell, an immune cell (i.e. naïve or memory B cells or naïve or memory T cells), a mesenchymal cell, a stem cell, a vesicle, such as an exosome, a liposome, a protein, a nucleic acid, a biological molecule, a naturally occurring or artificially prepared microscopic unit having an enclosed membrane, parasites (e.g. spirochetes, such as *Borrelia burgdorferi* which cause Lyme disease; malaria-inducing agents), microorganisms, viruses, or inflammatory cells. For example, the target analyte is a tumor cell from adipose tissue, an adrenal gland, bone marrow, a breast, a caudate, a cerebellum, a cerebral cortex, a cervix, a uterus, a colon, an endometrium, an esophagus, a fallopian tube, a heart muscle, a hippocampus, a hypothalamus, a kidney, a liver, a lung, a lymph node, an ovary, a pancreas, a pituitary gland, a prostate, a salivary gland, a skeletal muscle, skin, a small intestine, a large intestine, a spleen, a stomach, a testicle, a thyroid gland, or a bladder.

In the following descriptions, the term "non-target analyte" is used to describe a biological material which is not a target analyte.

In the following descriptions, the term "biomarker" is used to describe a substance that is present on or within the target analyte or target material (i.e. intracellular or extracellular the target analyte; internalized, such as through phagocytosis, within the target analyte; or the like). Biomarkers include, but are not limited to, peptides, proteins, subunits, domains, motifs, epitopes, isoforms, DNA, RNA, or the like. The biomarker may be a target molecule for drug delivery.

In the following descriptions, the term "affinity molecule" is used to describe any molecule that is capable of binding to or interacting with another molecule. The interaction or binding can be covalent or non-covalent. The affinity molecule includes, but is not limited to, an antibody, a hapten, a protein, an aptamer, an oligonucleotide, a polynucleotide, or any appropriate molecule for interacting with or binding to another molecule (e.g., a biomarker; a molecule of a binding pair or a complementary molecule, including, without limitation, biotin or an avidin; or, the like).

In the following descriptions, the term "detection moiety" is used to describe a compound or substance which provides a signal for detection, thereby indicating the presence of another compound or substance, an analyte, or the like within a sample or specimen. The detection moiety can be fluorescent, such as a fluorescent probe, or chromogenic, such as a chromogenic dye. The fluorescent probe can be a reactive dye, an organic dye, a fluorescent protein, a quantum dot, non-protein organic molecules, a nanoparticle (e.g., nanodiamond), or the like.

In the following descriptions, the term "channel" is used to describe a color or color range based on the signal provided by one or more detection moieties. The color or color range is obtained based on the filters chosen and/or the wavelength of the signal(s). For example, a channel may be violet, blue, green, yellow, orange, red, dark red, or the like. Furthermore, when a plurality of channels are used, each channel has a specific color or color range. For example, a first channel may be green and a second channel may be orange. It should be noted that although two or more detection moieties may provide signals having different wavelengths, the signals can be in the same channel based on the filter set used. For example, a first detection moiety provides a signal having a wavelength of 488 and a second detection moiety provides a signal having a wavelength of 500. Even though the wavelengths are not identical, the filter set in one of the channels passes wavelengths of both 488 nm and 500 nm, which permits both to be imaged at the same time, thereby producing a single image including the 488 and 500 emissions.

In the following descriptions, the terms "stain" or "label," which are used interchangeably, are used to describe an affinity molecule bound to or interacted with a detection moiety. The binding or interaction can be direct or indirect. Direct binding or interaction includes covalent or non-covalent interactions between the biomarker and the detection moiety. Indirect binding or interaction includes the use of at least first and second complementary molecules which form binding pairs. The first and second complementary molecules are, in combination, binding pairs which can bind or interact in at least one of the following manners: hydrophobic interactions, ionic interactions, hydrogen bonding interactions, non-covalent interactions, covalent interactions, affinity interactions, or the like. The binding pairs include, but are not limited to, immune-type binding-pairs, such as, antigen-antibody, antigen-antibody fragment, hapten-anti-hapten, or primary antibody-secondary antibody; nonimmune-type binding-pairs, such as biotin-avidin, biotin-streptavidin, folic acid-folate binding protein, hormone-hormone receptor, lectin-specific carbohydrate, enzyme-enzyme, enzyme-substrate, enzyme-substrate analog, enzyme-pseudo-substrate (substrate analogs that cannot be catalyzed by the enzymatic activity), enzyme-cofactor, enzyme-modulator, enzyme-inhibitor, or vitamin B12-intrinsic factor. Other suitable examples of binding pairs include complementary nucleic acid fragments (including complementary nucleotides, oligonucleotides, or polynucleotides); Protein A-antibody; Protein G-antibody; nucleic acid-nucleic acid binding protein; polymeric linkers (e.g., polyethylene glycol); or polynucleotide-polynucleotide binding protein. The binding pairs can be included within or used as amplification techniques. Amplification techniques are also implemented to increase the number of detection moieties bound to or interacted with the biomarker to increase a signal. In one embodiment, when binding pairs are used, the stain can be pre-conjugated, such that, during a labeling, staining, or adding step, the affinity molecule is already bound to or interacted with a detection moiety when added to the sample. In one embodiment, when binding pairs are used, the stain can be conjugated in the sample, such that the labeling, staining, or adding step includes at least two sub-steps including introducing (in any desired or appropriate order) an affinity molecule-first binding molecule conjugate and a second binding pair molecule-detection moiety conjugate, wherein the first and second binding pair molecules are complementary and bind to or interact with each other.

Furthermore, "a plurality of stains" can be used to describe two or more stains in which the affinity molecules and/or the detection moieties are different. For example, anti-CK-Alexa 647 is different than anti-EpCAM-Alexa 647. As another example, anti-CK-Alexa 647 is different than anti-CK-Alexa 488.

In the following descriptions, the term "conjugate" is used to describe a first chemical, molecule, moiety, or the like bound to or interacted with a second chemical, molecule, moiety, or the like. The binding or interaction is direct or indirect. Direct binding or interaction includes covalent or non-covalent interactions between the biomarker and the detection moiety. Indirect binding or interaction includes the use of at least first and second complementary molecules which form binding pairs. The first and second complementary molecules are, in combination, binding pairs which binds or interacts in at least one of the following manners: hydrophobic interactions, ionic interactions, hydrogen bonding interactions, non-covalent interactions, covalent interactions, affinity interactions, or the like. The binding pairs include, but are not limited to, immune-type binding-pairs, such as, antigen-antibody, antigen-antibody fragment, hapten-anti-hapten, or primary antibody-secondary antibody; nonimmune-type binding-pairs, such as biotin-avidin, biotin-streptavidin, folic acid-folate binding protein, hormone-hormone receptor, lectin-specific carbohydrate, enzyme-enzyme, enzyme-substrate, enzyme-substrate analog, enzyme-pseudo-substrate (substrate analogs that cannot be catalyzed by the enzymatic activity), enzyme-cofactor, enzyme-modulator, enzyme-inhibitor, or vitamin B12-intrinsic factor. Other suitable examples of binding pairs include complementary nucleic acid fragments (including complementary nucleotides, oligonucleotides, or polynucleotides); Protein A-antibody; Protein G-antibody; nucleic acid-nucleic acid binding protein; polymeric linkers (e.g., polyethylene glycol); or polynucleotide-polynucleotide binding protein.

In the following description, the term "signal" is used to describe an electric current or electromagnetic field which conveys data from one place or source to another place or detector. For example, a signal can be light emitted by a detection moiety to convey the presence of the detection moiety on or within a target analyte, such as a cell.

In the following description, the term "noise" is used to describe an unwanted signal or a modification of a signal during capture, transmission, transmission, processing, and/or conversion of the signal. "Noise," unless explicitly stated to be non-inclusive, includes "autofluorescence" or "background"; though "autofluorescence" or "background" are not intended to include "noise." In other words, "autofluorescence" and "background" are subsets of "noise." Additionally, "noise" includes bleed-through and/or unintended/unwanted signal of a detection moiety from another channel. For example, a detection moiety excited at 488 can have an emission tail that overlaps with an emission curve of a detection moiety excited at 500. The emission tail of the 488-detection moiety is considered noise within the 500-detection moiety channel.

In the following description, the term "reference channel" is used to describe a channel which, whether hidden or displayed, captures the noise and/or autofluorescence/background present when acquiring, whether prior to, simultaneously with, or after, one or more images of one or more signals provided by one or more detection moieties.

Optical Path

FIG. 1A shows an optical path of a fluorescent microscope. The optical path includes an excitation source 102 which emits an excitation light 104, such as a light in the visible, infrared ("IR"), or ultraviolet ("UV") spectra. The excitation light 104 comprises a plurality of wavelengths, including at least a first excitation wavelength 106 and a second excitation wavelength 108. The excitation light 104 interacts with an excitation spectrum selector 110, such that the first excitation wavelength 106 passes through the excitation spectrum selector 110 and the second excitation wavelength 108 is blocked from passing through the excitation spectrum selector 110. The first excitation wavelength 106 is then reflected off a second filter 112. The second filter 112 re-directs the first excitation light 106 into an objective 114.

The objective 114 receives the first excitation wavelength 106 and focuses the first excitation wavelength at a point or surface on, within, or near a sample or fraction thereof 134. The first excitation wavelength 106 stimulates a first detection moiety (not shown) on or with the sample or fraction thereof 134, thereby causing the first detection moiety (not shown) to emit a first emission light 116 having a first emission wavelength. The first emission light 116 can be captured by the objective 114, passed back through the second filter 112, passed through an emission spectrum selector 130, and onto an emission detector 140. The emission detector 140 can be a charge-coupled device ("CCD"), CMOS camera, a scientific CMOS camera, photodiode, photomultiplier tube, or the like for capturing image data, which can then be compiled into images, processed and analyzed by a computer or associated software or programs.

The excitation source 102 emits the excitation light 104 again. The excitation light 104, however, now interacts with the excitation spectrum selector 110, such that the second excitation wavelength 108 passes through the excitation spectrum selector 110 and the first excitation wavelength 106 is blocked from passing through the excitation spectrum selector 110. The second excitation wavelength 108 is then reflected off the second filter 112. The second filter 112 re-directs the second excitation light 108 into the objective 114. The objective 114 receives the second excitation wavelength 108 and focuses the first excitation wavelength at a point or surface on, within, or near a sample or fraction thereof 134. The second excitation wavelength 108 stimulates the first detection moiety (not shown) on or with the sample or fraction thereof 134, thereby causing the first detection moiety (not shown) to emit a second emission light 118 having a second emission wavelength. The second emission light 118 can be captured by the objective 114, passed back through the second filter 112, passed through the emission spectrum selector 130, and onto an emission detector 140.

The process discussed can be performed any number of times for any number of detection moieties.

The second filter 112 can each be a dichroic, polychroic, bandpass, bandstop, or any appropriate filter.

The sample or fraction thereof 134 can be located on a base 132 or between a cover 136 and the base 132. The cover 136 and the base 132 can be optically clear to permit imaging. The sample 134, the cover 136, and the base 132 can be located on a platform 128 to move the sample 134 in an x-, y-, or z-direction as required. The platform 128 can include an aperture 138 which allows the first excitation wavelength 106, having been focused by the objective 114, into, on, or near the sample or fraction thereof 134. The platform 128 can be driven by a driver 120, which includes at least one of a z-direction drive 124, an x-direction drive 122, and a y-direction drive 126 to position the sample 134. The driver 120 can be a motor, such as a servomotor or a stepper motor, a piezo-electric actuator, a solenoid, or the like.

The optical path can also include a cut-off aperture (not shown), such as in a confocal microscope, to increase the signal/noise ratio of the boundary light signal.

The base 132 can be composed of glass; an inert metal; a metal including, but not limited to, gold, silver, aluminum, tin, copper, bronze, chromium, cobalt, nickel, palladium, platinum, manganese, zinc, titanium, niobium, molybdenum, tungsten, or a suitable metalloid; organic or inorganic materials, and plastic materials, such as polyoxymethylene ("Delrin®"), polystyrene, acrylonitrile butadiene styrene ("ABS") copolymers, aromatic polycarbonates, aromatic polyesters, carboxymethylcellulose, ethyl cellulose, ethylene vinyl acetate copolymers, nylon, polyacetals, polyacetates, polyacrylonitrile and other nitrile resins, polyacrylonitrile-vinyl chloride copolymer, polyamides, aromatic polyamides ("aramids"), polyamide-imide, polyarylates, polyarylene oxides, polyarylene sulfides, polyarylsulfones, polybenzimidazole, polybutylene terephthalate, polycarbonates, polyester, polyester imides, polyether sulfones, polyetherimides, polyetherketones, polyetheretherketones, polyethylene terephthalate, polyimides, polymethacrylate, polyolefins (e.g., polyethylene, polypropylene), polyallomers, polyoxadiazole, polyparaxylene, polyphenylene oxides ("PPO"), modified PPOs, polystyrene, polysulfone, fluorine containing polymer such as polytetrafluoroethylene, polyurethane, polyvinyl acetate, polyvinyl alcohol, polyvinyl halides such as polyvinyl chloride, polyvinyl chloride-vinyl acetate copolymer, polyvinyl pyrrolidone, polyvinylidene chloride, specialty polymers, polystyrene, polycarbonate, polypropylene, acrylonitrite butadiene-styrene copolymer and others; and combinations thereof. The cover 138 can be composed of an optically transparent material.

Figure 1B:
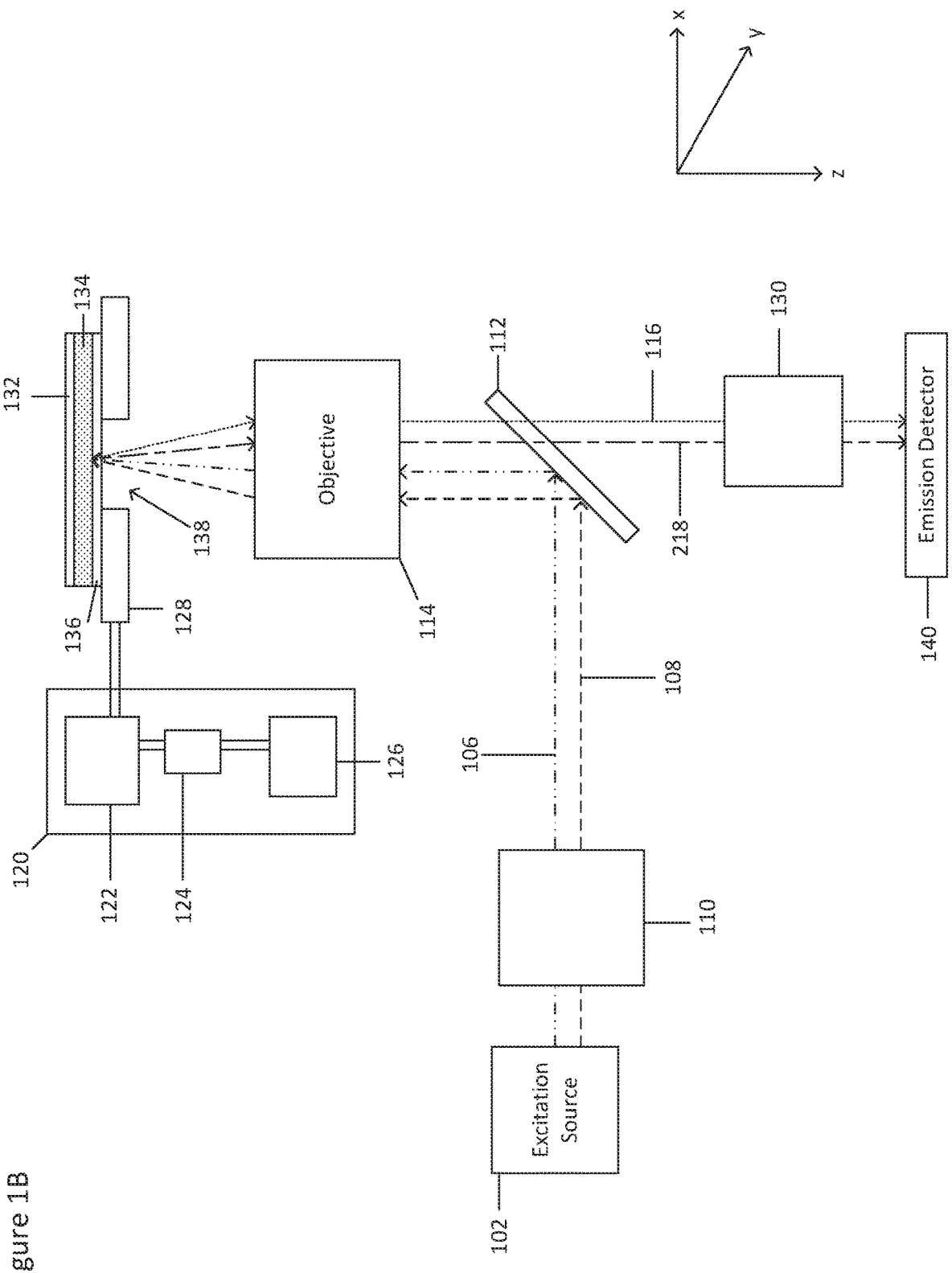
FIG. 1B shows an example optical path of a fluorescent microscope.

FIG. 1B shows an optical path of a fluorescent microscope similar to that of FIG. 1A, except that the excitation source 102 emits the first and second excitation wavelengths are separate lights 106, 108.

Figure 3A:
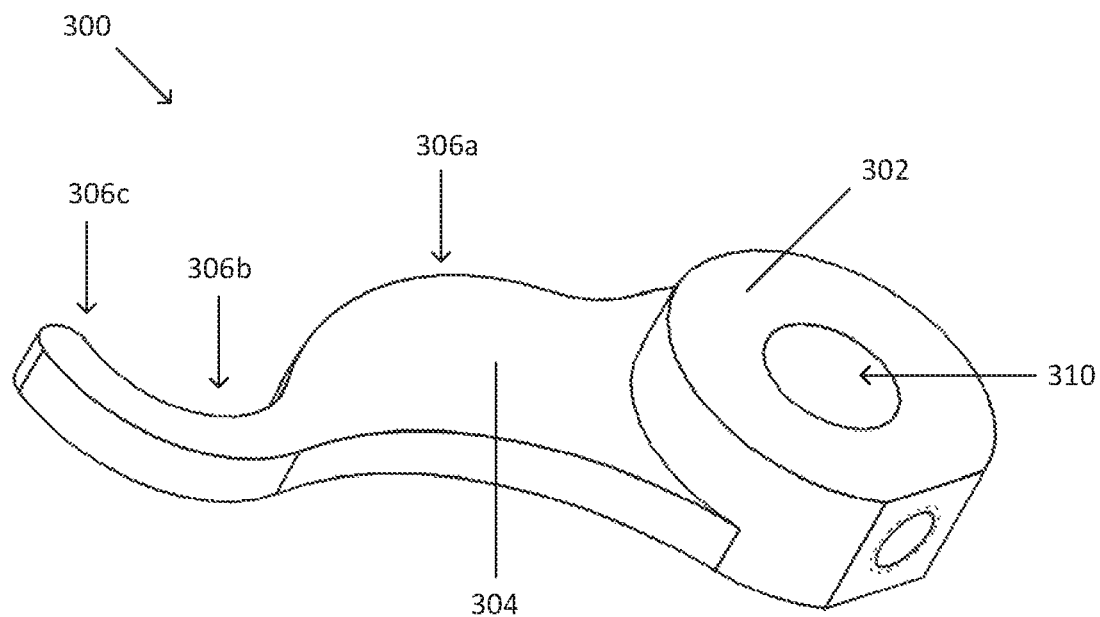
FIGS. 3A-3D show an example cam.
Figure 3B:
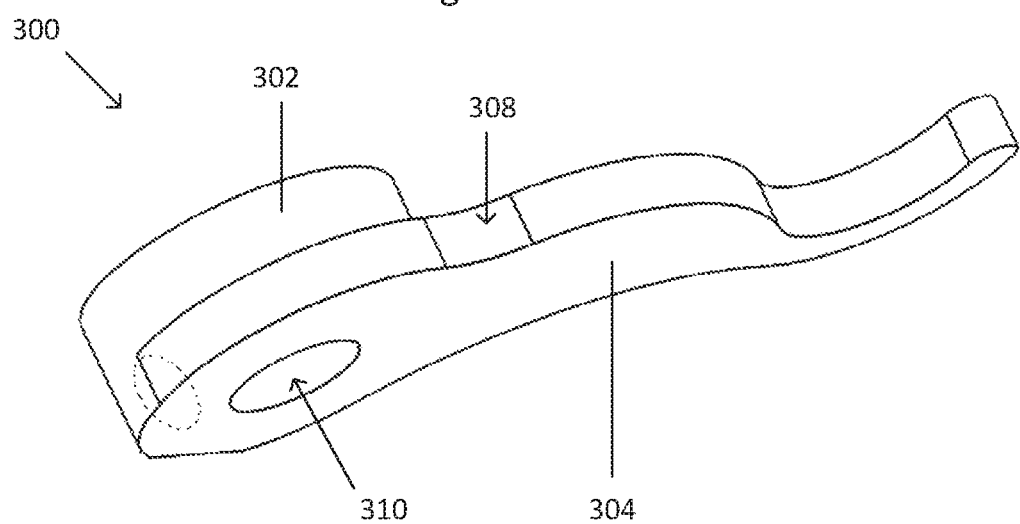
Figure 3C:
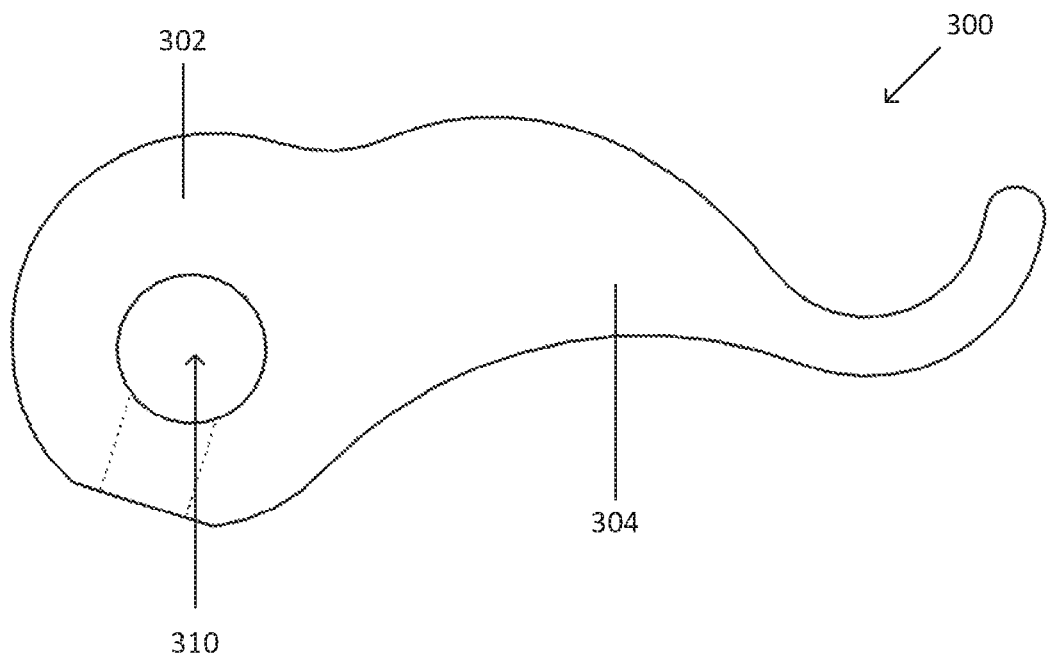
Figure 3D:
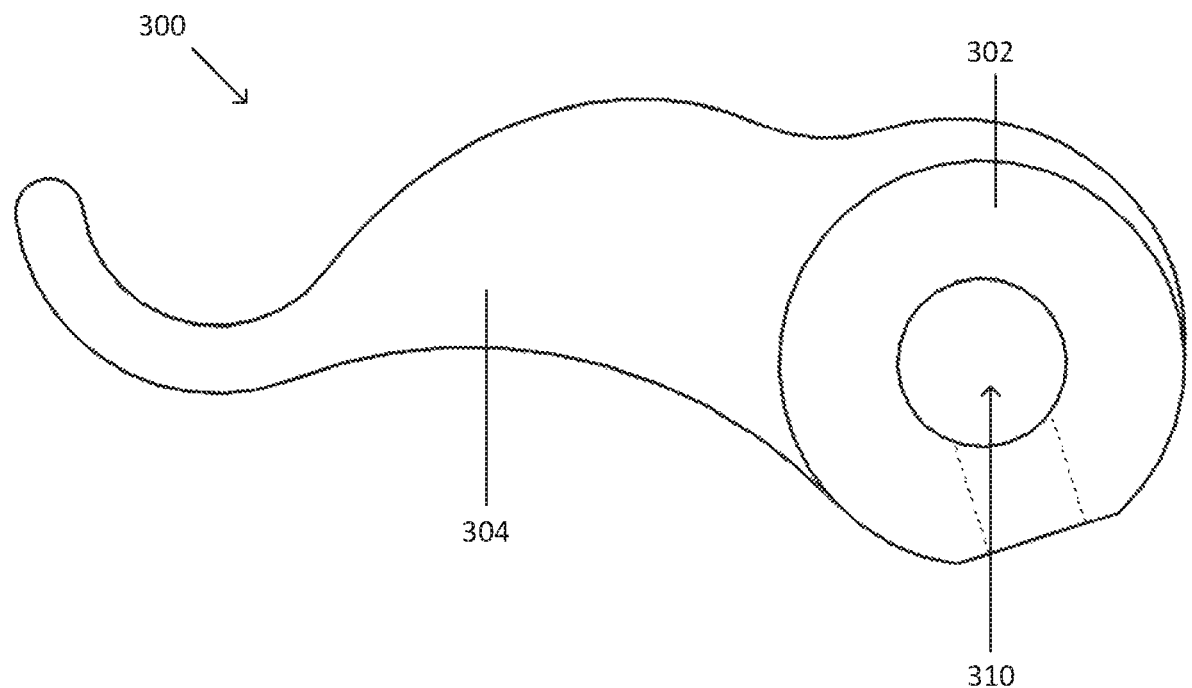
Figure 4A:
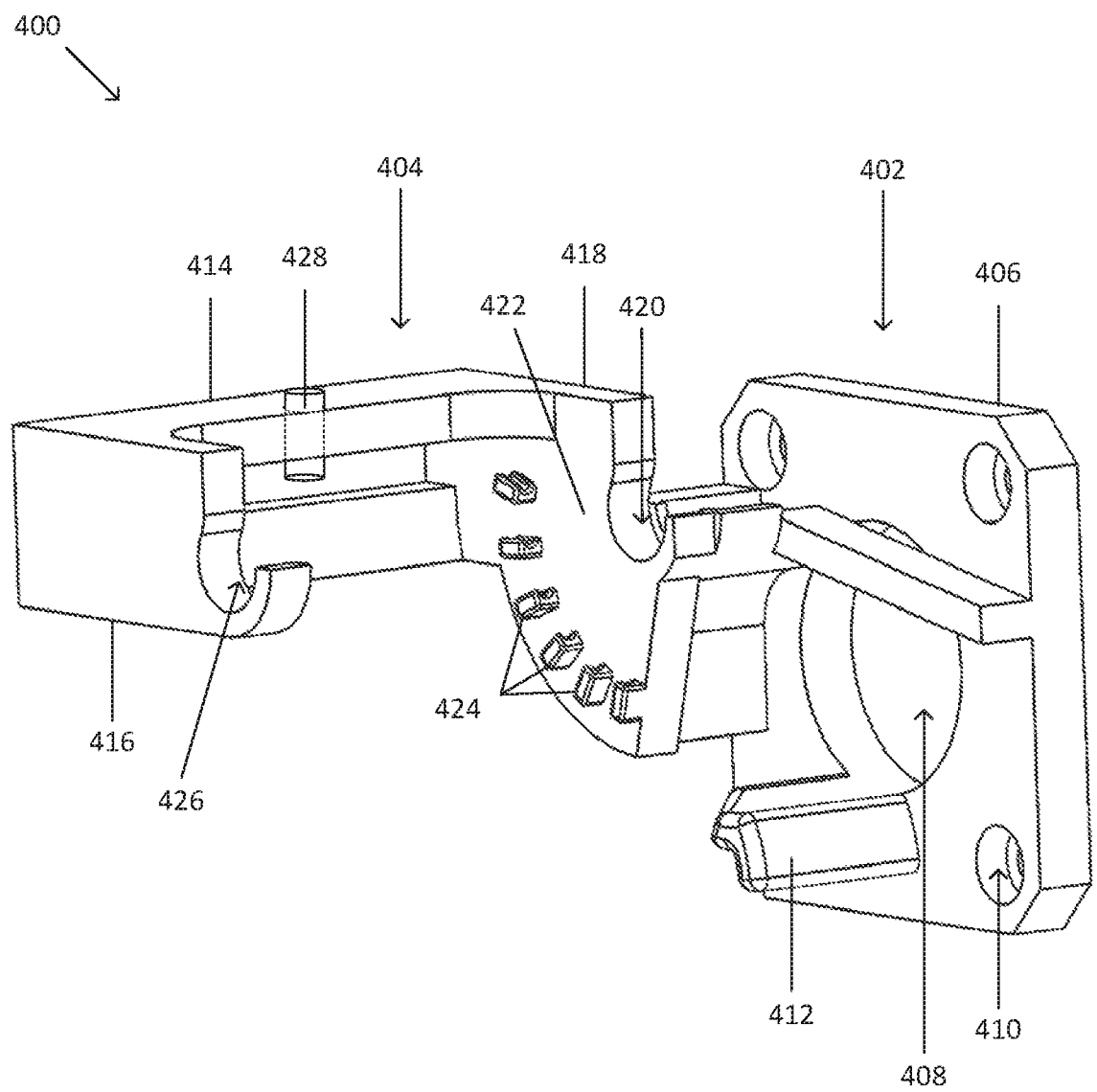
FIGS. 4A-4B show isometric views of an example adapter.
Figure 4B:
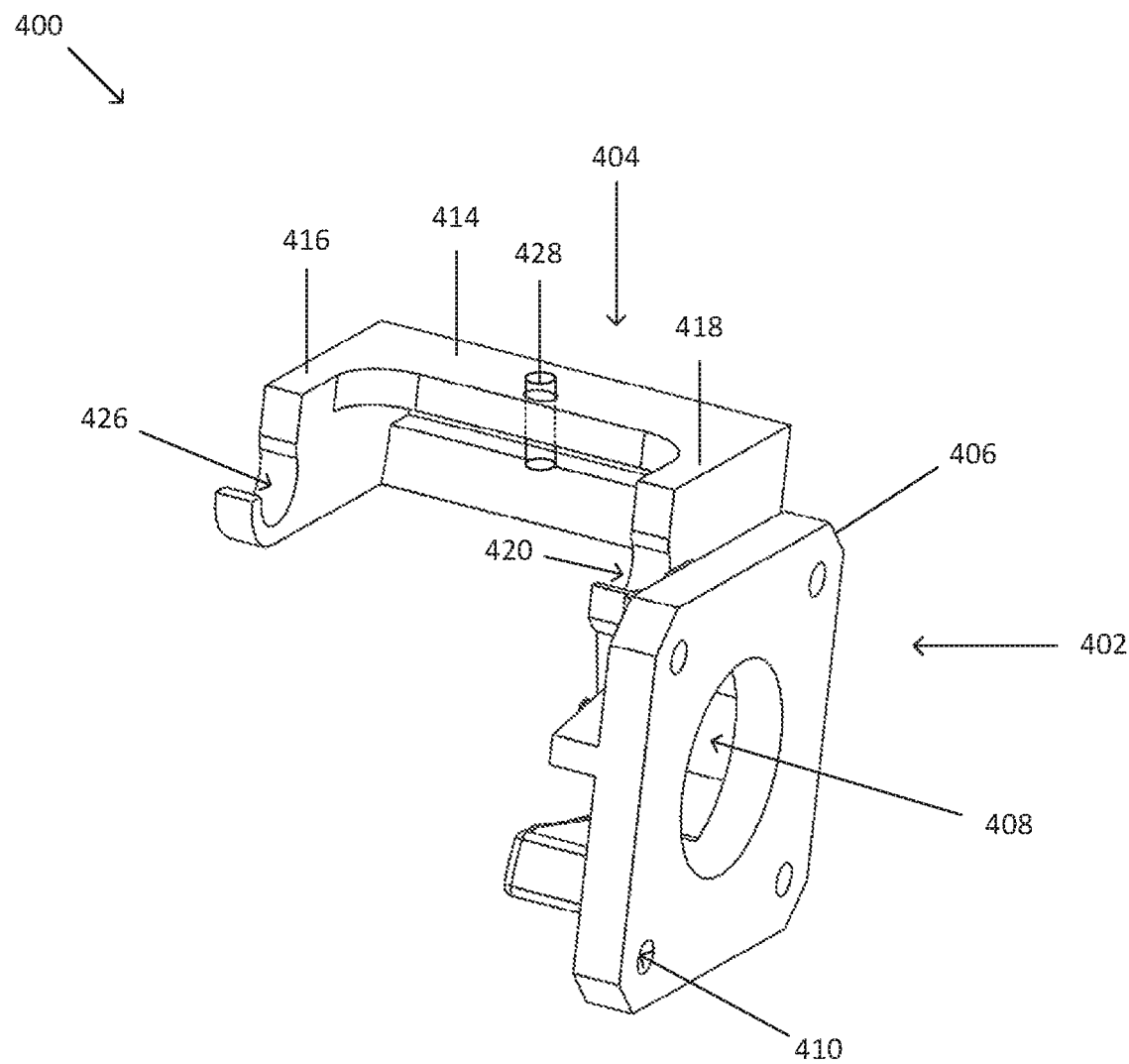
Figure 4C:
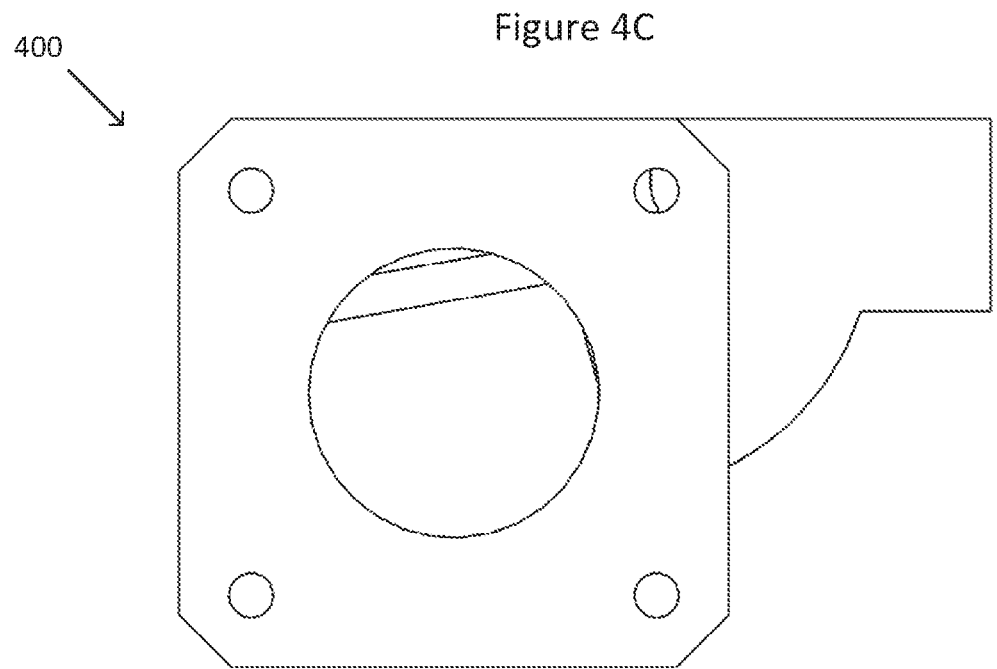
FIGS. 4C-4D show side views of the example adapter.
Figure 4D:
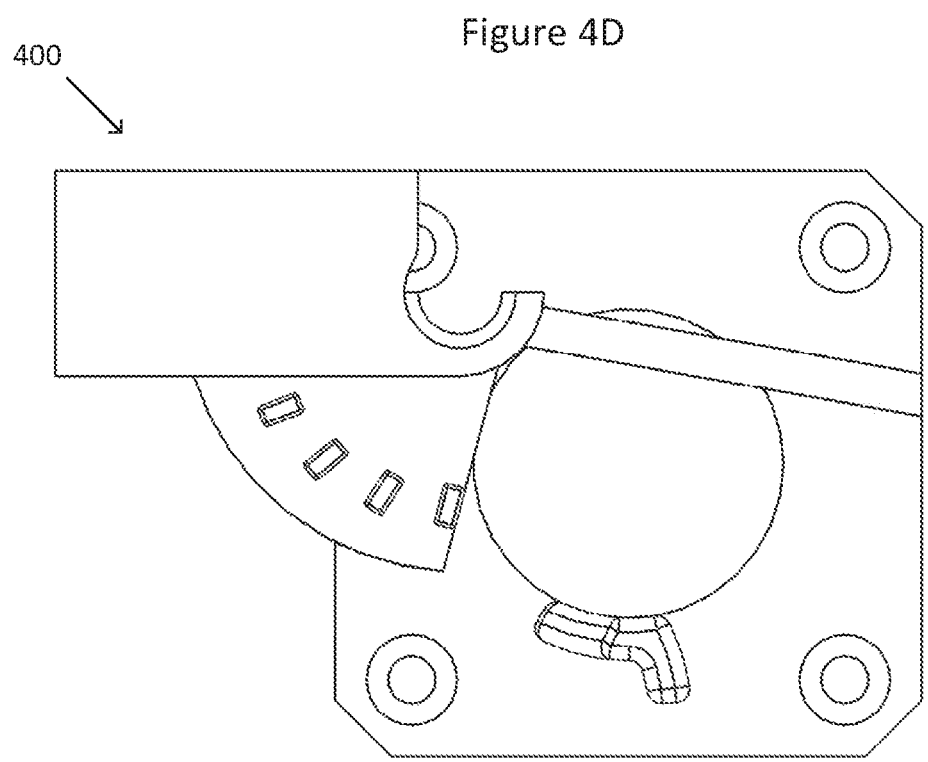

In one embodiment, the excitation spectrum selector 110 or the emission spectrum selector 130 can be a filter to block or pass given wavelengths. In one embodiment, the excitation spectrum selector 110 or the emission spectrum selector 130 comprises a notch filter, a bandstop filter, or a bandpass filter. In one embodiment, the excitation spectrum selector 110 or the emission spectrum selector 130 comprises a diffraction grating. In one embodiment, the excitation spectrum selector 110 or the emission spectrum selector 130 comprises a filter wheel. In one embodiment, the excitation spectrum selector 110 or the emission spectrum selector 130 comprises a filter or filter wheel capable of being re-angled to block or pass given wavelengths based on the angle at which the filter or filter wheel is tilted, turned, or adjusted (for example, as shown in FIGS. 3A and 3B). As an example, the first excitation wavelength 106 passes through the excitation spectrum selector 110 and the second excitation wavelength 108 is blocked from passing through the excitation spectrum selector 110 due to the angle of the excitation spectrum selector. Then, the excitation spectrum selector 110 can be re-angled(θ)—such as by a driver (not shown) connected to the optical selection substrate 130 or by magnetic means thereby attracting or repelling the optical selection substrate 130 in an appropriate direction—to block the first excitation wavelength 106 and pass the second excitation wavelength 108. The driver (not shown) can be a motor, such as a servomotor or a stepper motor, a piezoelectric actuator, a solenoid, or the like. Though the example discusses the excitation spectrum selector 110, the first excitation wavelength 106, and the second excitation wavelength 108, the optical pathway is not intended to be so limiting. Re-angling can be applied to the emission spectrum selector 130 to block and pass certain emission wavelengths.

Figure 1C:
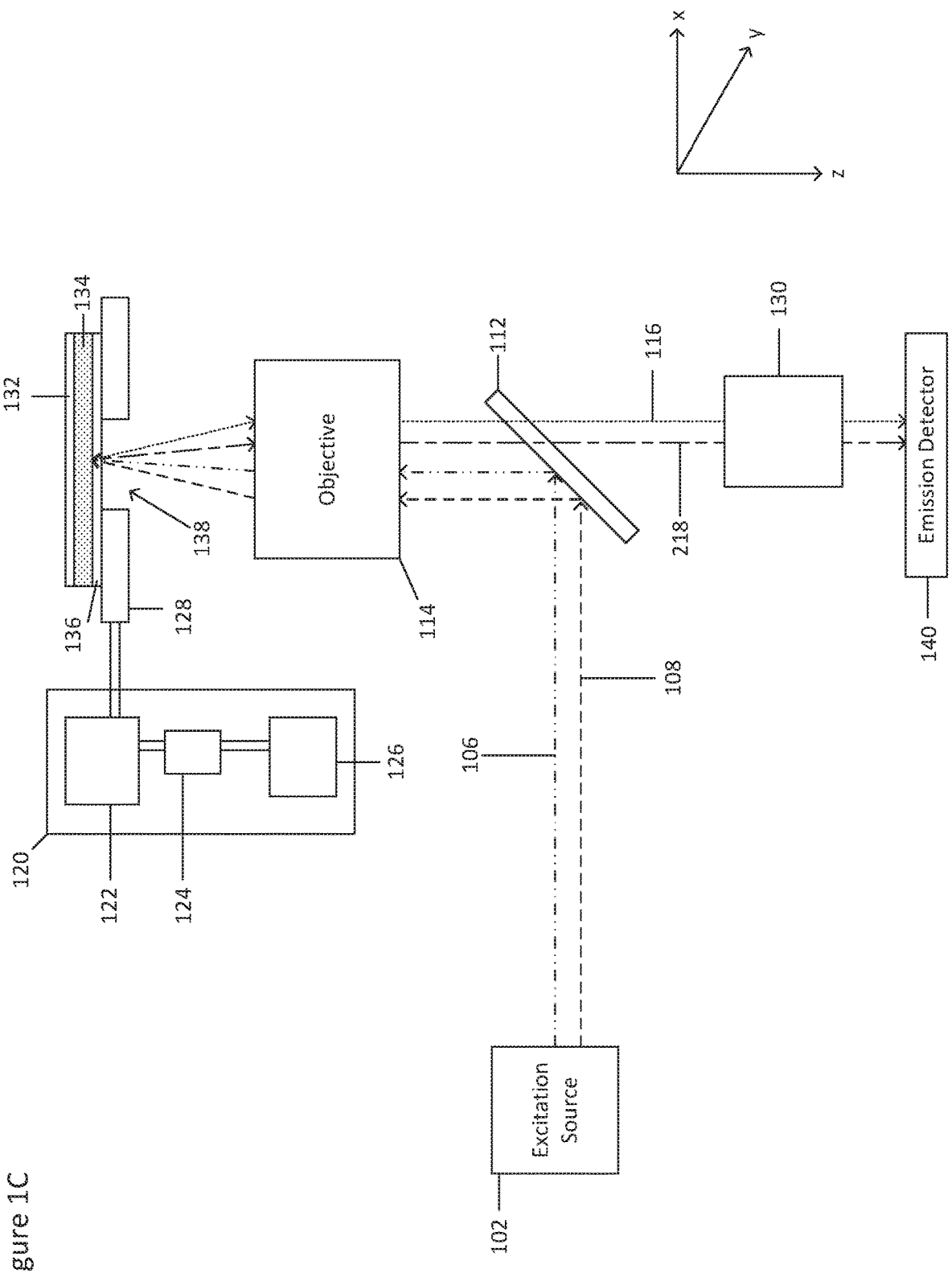
FIG. 1C shows an example optical path of a fluorescent microscope.
Figure 2A:
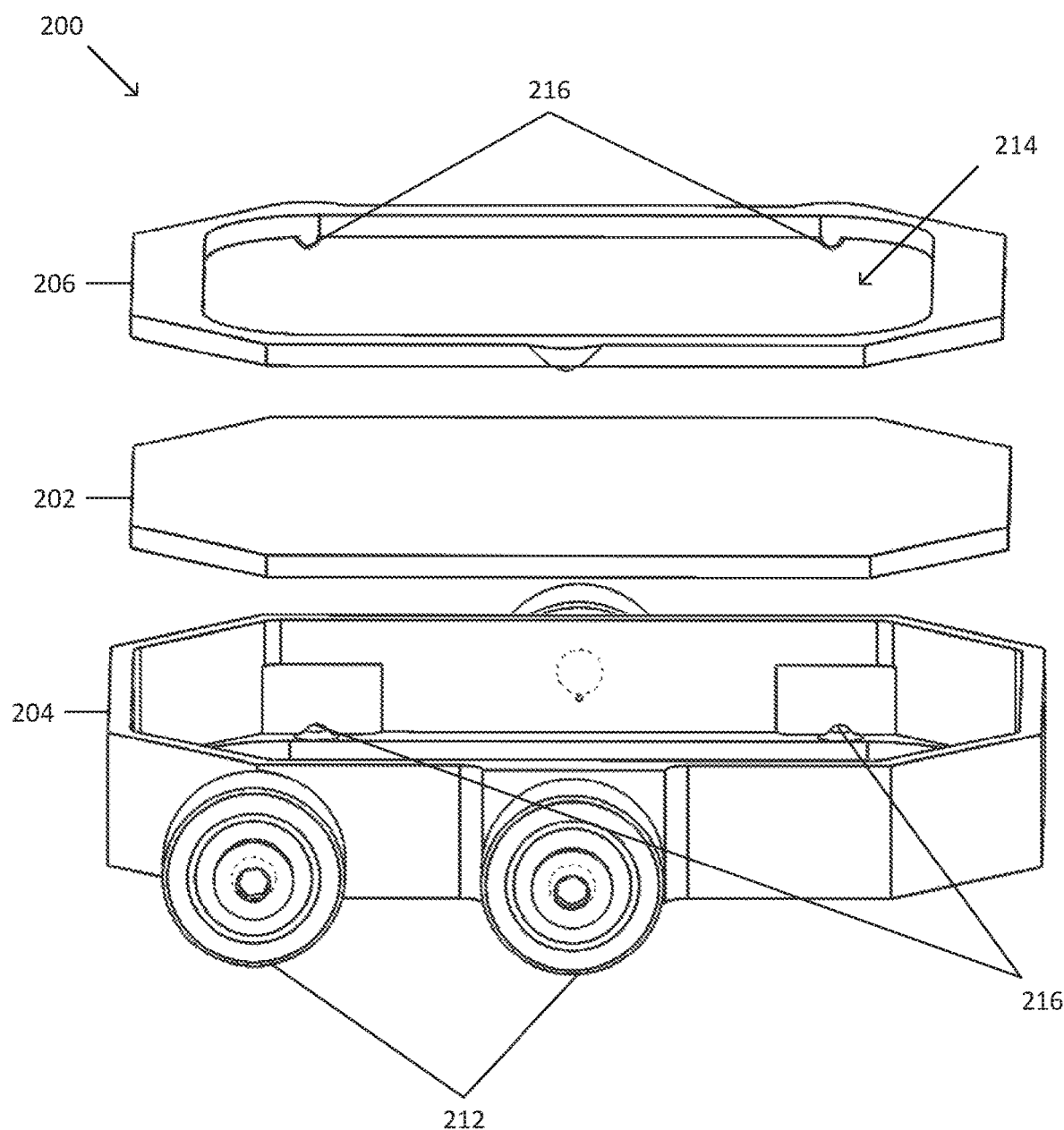
FIGS. 2A-2C show exploded views of an example filter assembly.
Figure 2B:
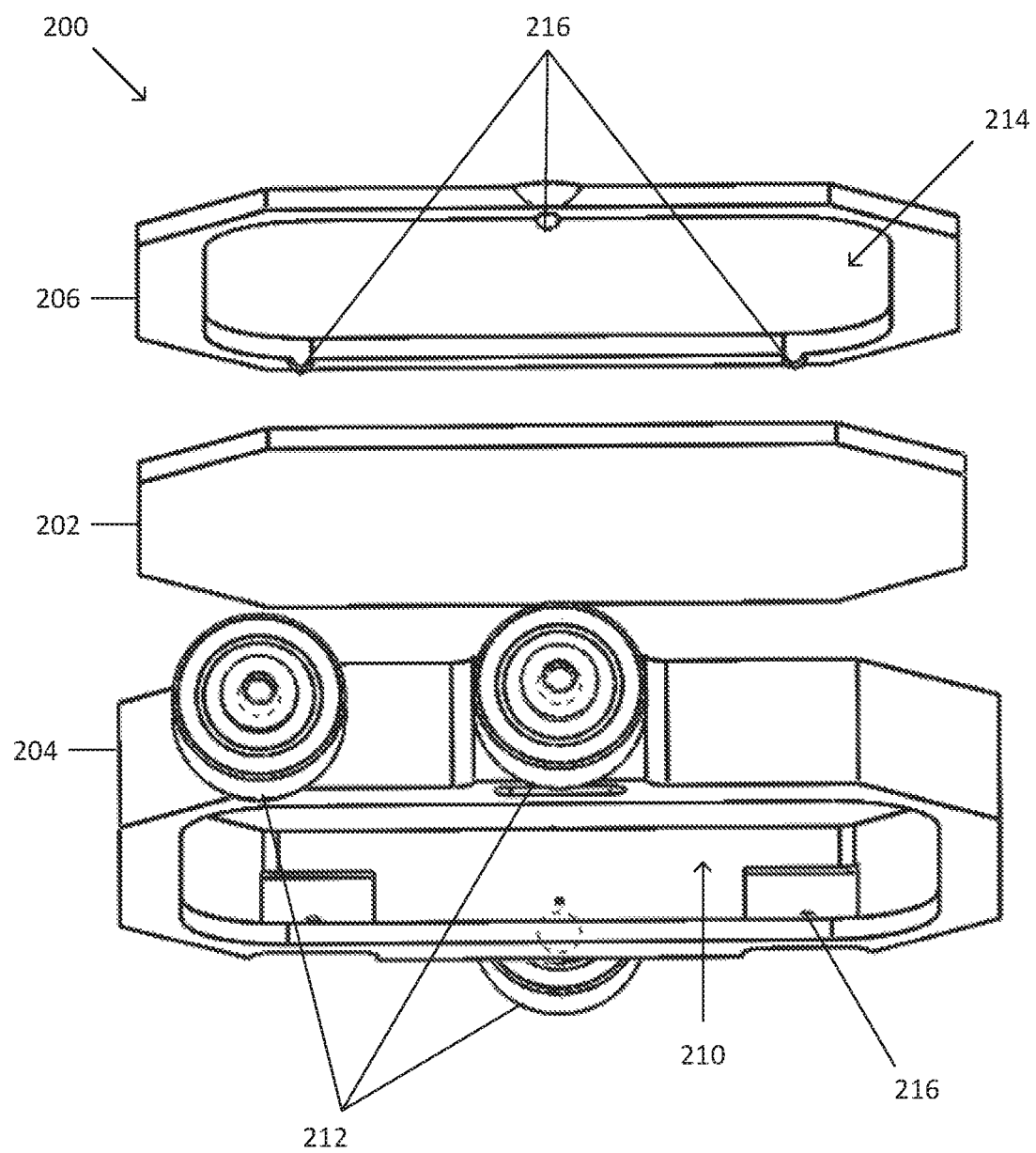
Figure 2C:
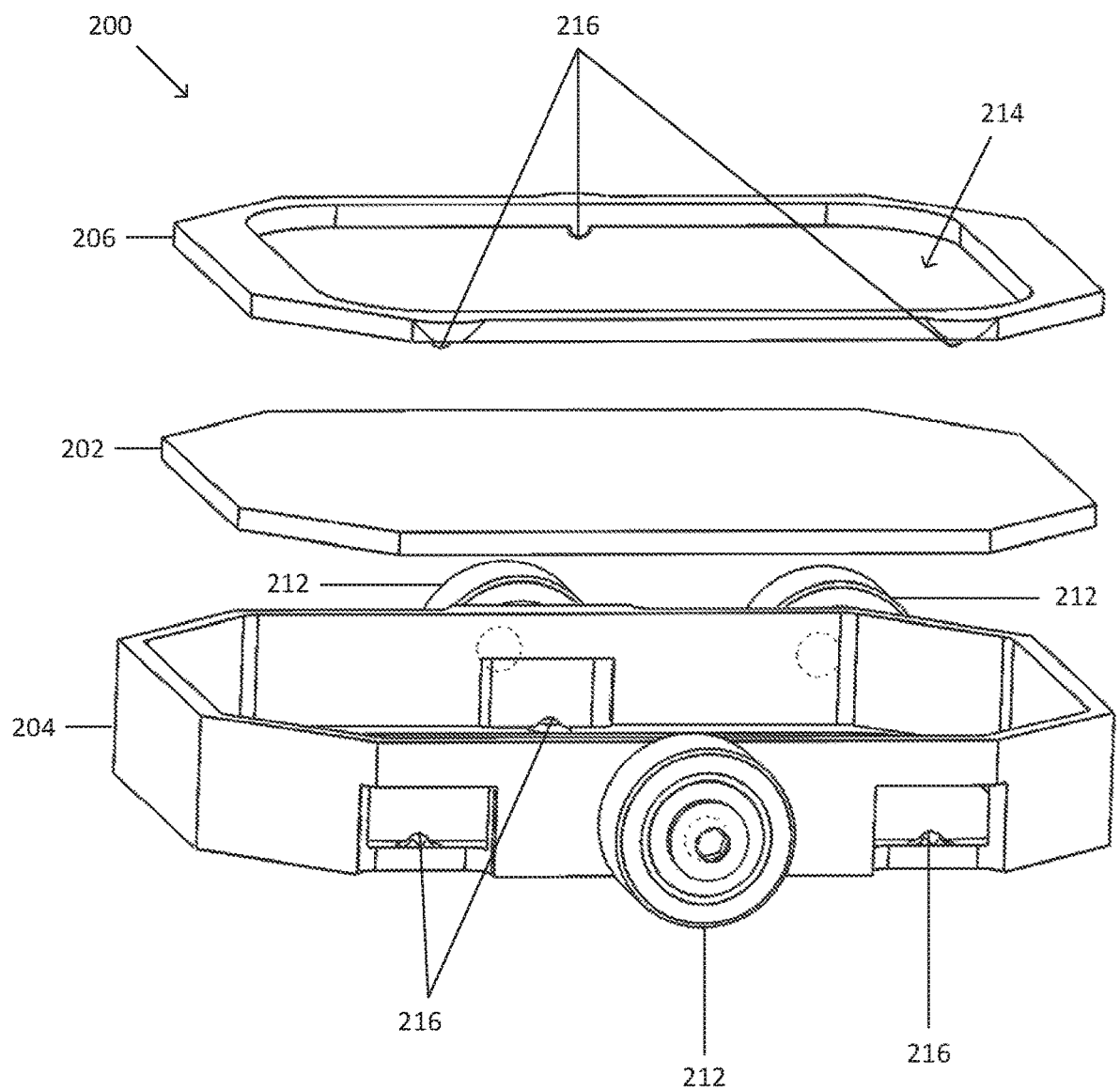
Figure 2D:
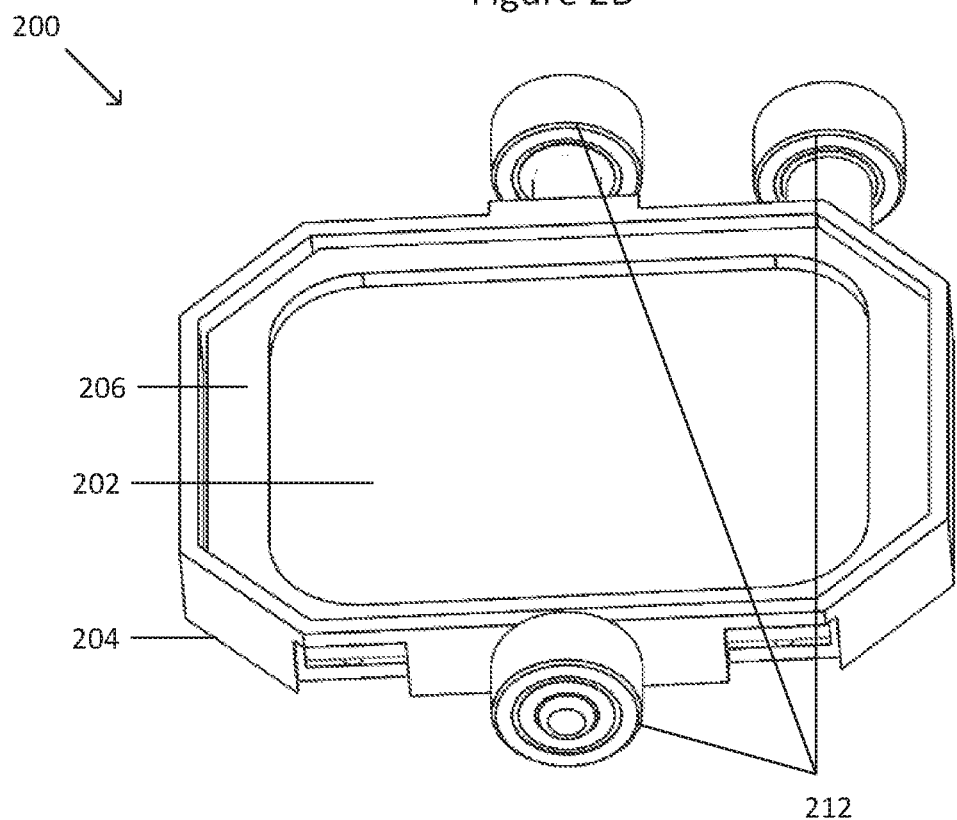
FIGS. 2D-2E show isometric views of the example filter assembly.
Figure 2E:
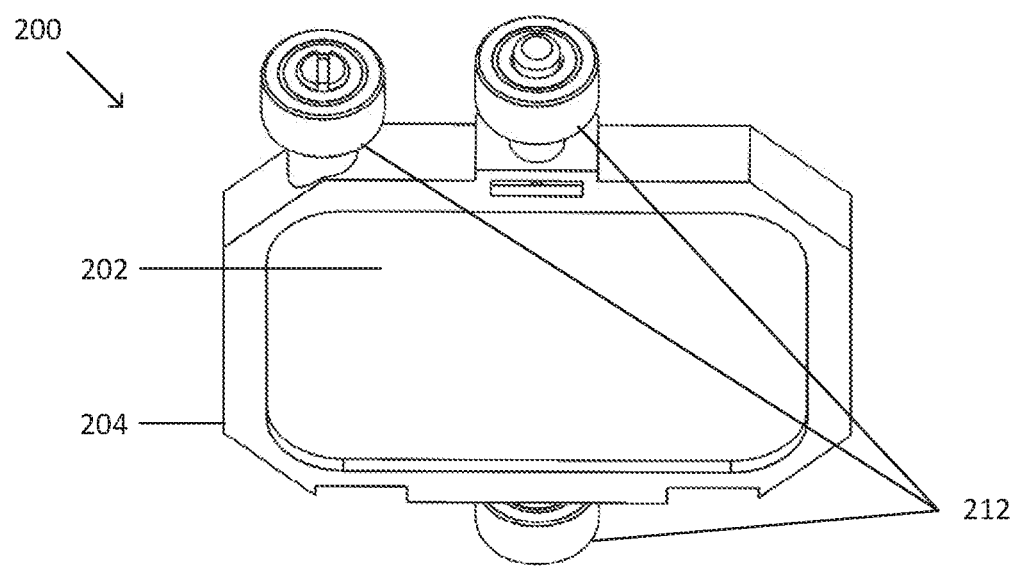

FIG. 1C shows an optical path of a fluorescent microscope similar to that of FIG. 1B, except that the excitation spectrum selector 110 is not incorporated into the optical path.

Spectrum Selector

FIGS. 2A-2E show a filter assembly 200. The filter assembly 200 holds a filter 202 within a case comprising a base 204 and a retainer 206. In one embodiment, the base 204 and the retainer 206 each comprise one or more protuberance 208 extending therefrom towards the filter 202 to inhibit direct contact of the filter 202 with other portions of the base 204 and the retainer 206. For example, the base 204 and the retainer 206 can each comprise 1, 2, 3, 4, 5, 6, 7, 8, 9, 10, or more protuberances 216.

The base 204 can be sized and shaped to accept the filter 202. The base 204 further comprises a base window 210 to permit light to pass to, through, and/or from the filter 202. The base 204 further comprises one or more bearings 212. The one or more bearings 212 allow for rotation and/or translation of the filter 202, the base 204, and the reatiner 206, so as to change the angle of incidence between the exciation/emission light and the filter 202.

The retainer 206 can be sized and shaped to fit within or on top of the base 204. The retainer 206 further comprises a retainer window 214 to permit light to pass to, through, and/or from the filter 202.

A cam, such as cam 300, is configured to engage with the filter assembly 200, though, more specifically, with one of the bearings 212 of the filter assembly 200, to change the angle of incidence between the filter 202 and the emission or excitation light. The cam 300 comprises a main body and tail extending from the main body. The tail of the cam 300 can be any appropriate shape or configuration, for example, rectangular, cubical, triangular, pyramidal, curved, hooked, horn-shaped, combinations thereof, or the like. Furthermore, the tail can be sized and shaped so as to avoid any other components when the cam 300 is rotated. In one embodiment, the main body comprises a projection extending outwardly from the main body to mate with the motor or connector to adjoin the motor and the cam. In one embodiment, the cam and the motor are a single piece.

In one embodiment, a cam 300 comprises a tail 304 being shaped like a horn, as shown in FIGS. 3A-3D. The cam 300 comprises a main body 302 and a tail 304 extending from the main body 302, the tail 304 comprising an engagement surface 308 to engage one or more of the bearings 212 of the filter assembly 200. The main body 302 further comprises a bore 310 extending at least partially therethrough to mate with a motor or connector to adjoin the motor and the cam 300. The horn shape comprises at least one peak 306a, at least one valley 306b, and a tip 306c. In one embodiment, the horn-shaped tail 304 comprises a first valley between the main body 302 and a first peak, a first peak, a second valley, and the tip 306c. In one embodiment, the horn-shaped tail 304 comprises a first peak transitioning directly from the main body 302, a first valley, and the tip 306c.

FIGS. 4A-4D show an adapter 400. The adapter 400 comprises a motor segment 402 and a filter segment 404. The motor segment 402 engages with a motor (not shown); the filter segment 404 engages with the filter assembly 200.

The motor segment 402 comprises a main body 406 comprising a spindle bore 408 through which a spindle of a motor can be placed and one or more attachment bores 410 to attach the adapter to the motor. In one embodiment, the motor segment 402 further comprises a stop 412 projecting in direction away from the motor to inhibit rotation or movement of the cam 300 beyond a certain point.

The filter segment 404 comprises a stanchion 414 adjoined to a first arm 416 and a second arm 418. The stanchion 414 comprises a stopper 428 to set a travel limit on the filter assembly when located within or proximal to the adapter 400. The stopper 428 can be a screw, rod, dowel, post, spring, overhang, combinations thereof, of the like.

The first arm 416 comprises a cut-out 426 being sized and shaped to receive at least one of the bearings 212 of the filter assembly 200. The second arm 418 is proximal to and/or adjoined to the motor segment 402. The second arm 418 comprises a cut-out 420 being sized and shaped to receive at least one of the bearings 212 of the filter assembly 200. The second arm 418 further comprises an inner face 422 comprising one or more steps 424, the one or more steps 424 being located at various points along the inner face 422 to set maximum distances to be traveled by the filter assembly 200 and/or to set tensions exerted by a spring (not shown) on the filter assembly 200.

FIGS. 5A-5D show an embodiment of a spectrum selector 500. The spectrum selector 500 comprises the filter assembly 200, the cam 300 extending from or adjoined to a motor 502, and the adapter 400. The spectrum selector 500 provides a range of angle of incidence between the filter 202 of the filter assembly 200 and the emission/excitation light. For example, the angle of incidence can be 0°, 1°, 2°, 3°, 4°, 5°, 6°, 7°, 8°, 9°, 10°, 11°, 12°, 15°, 20°, 25°, 30°, 40°, 45°, 50°, 60°, 70°, 75°, 80°, 85°, or 89.9°. In one embodiment, the angle of incidence can be up to, but not inclusive of, 90°. In one embodiment, the angle of incidence can be less than 90°. In one embodiment, the angle of incidence can be from 0° to 89.9°. Additionally, the angle of incidence can be changed from a first time point to a second time point, such as to acquire separate images in different wavelengths.

Figure 5A:
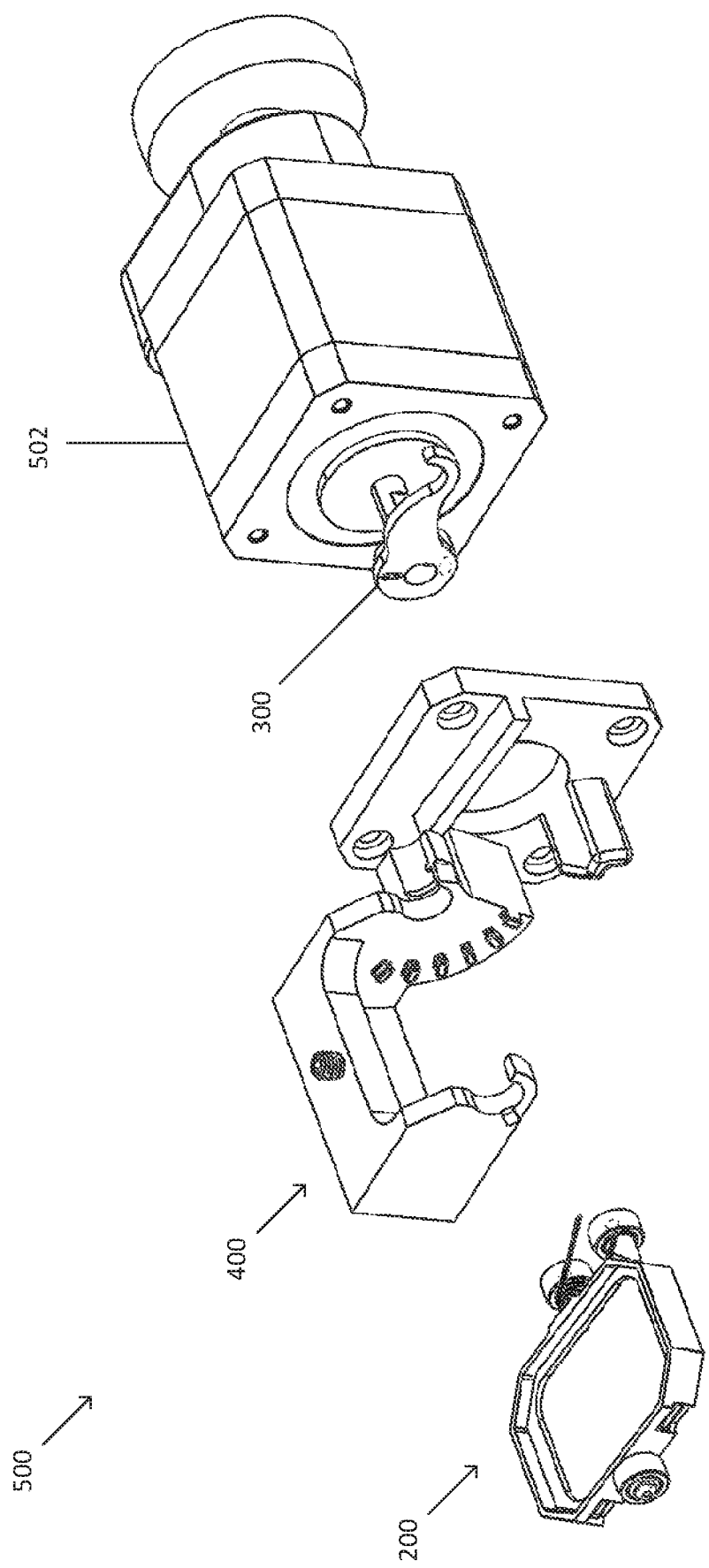
FIGS. 5A-5B show exploded views of a spectrum selector.
Figure 5B:
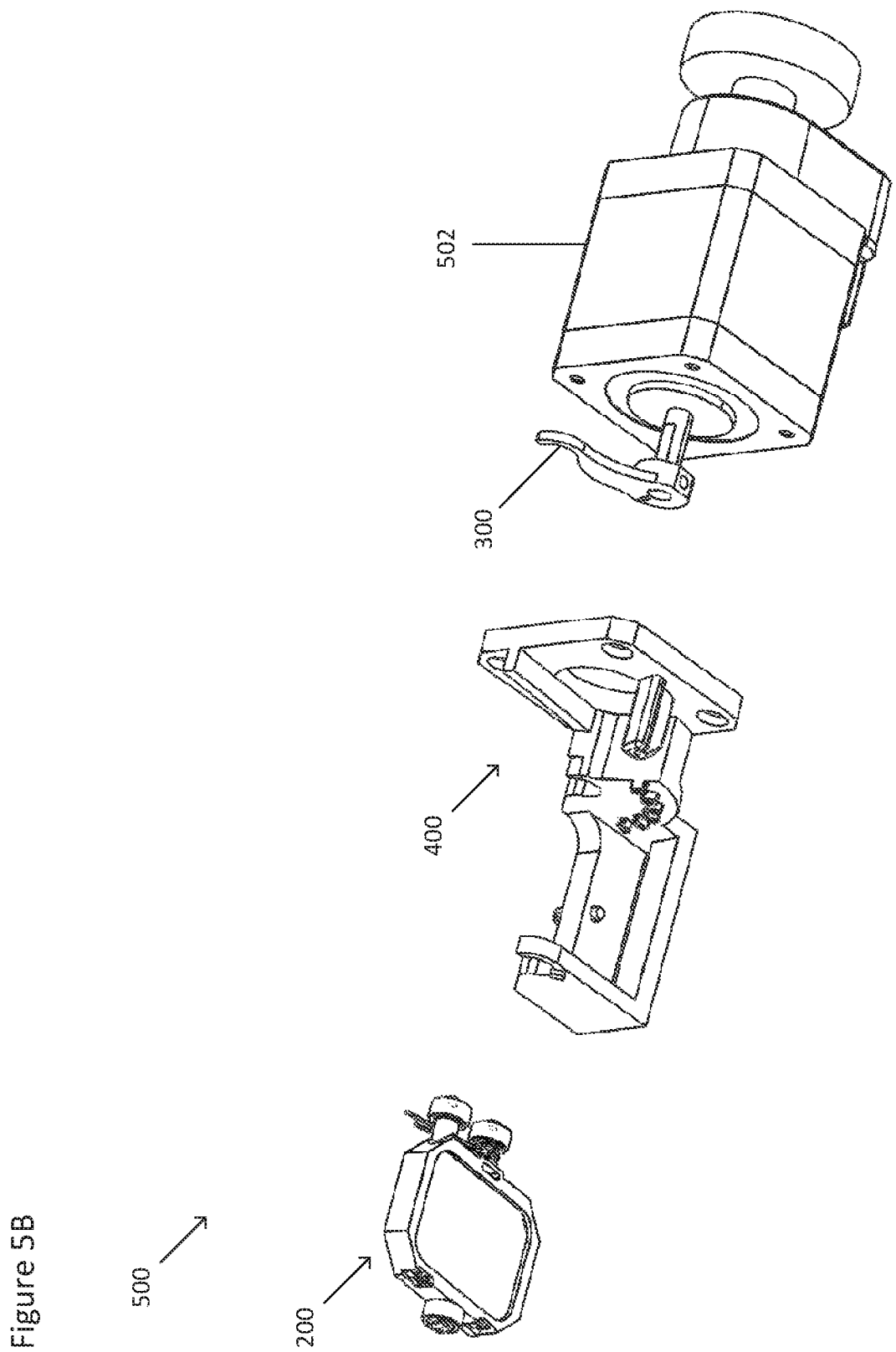
Figure 5C:
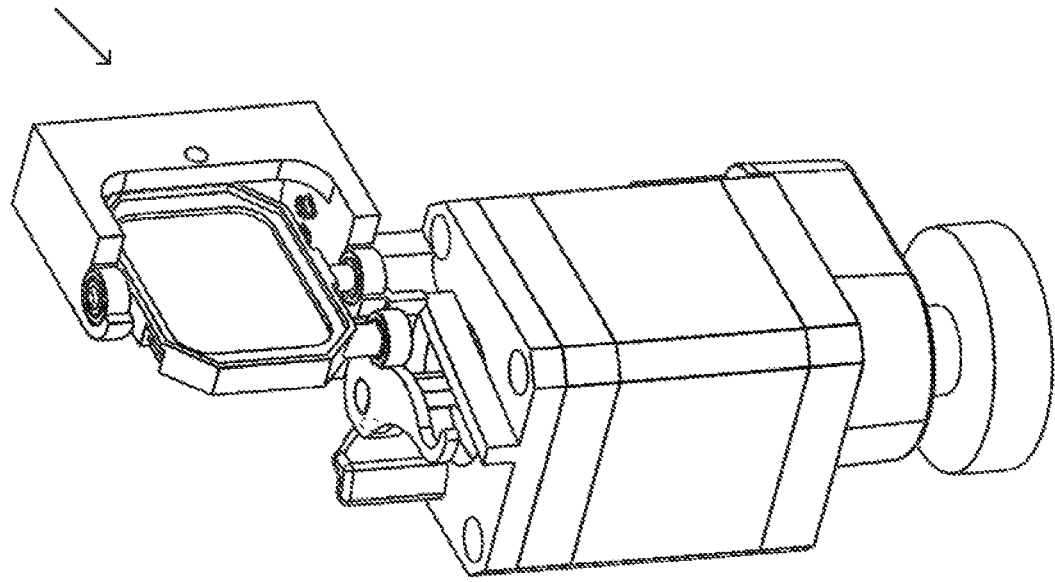
FIG. 5C-5D shows isometric views of the example spectrum selector.
Figure 5D:
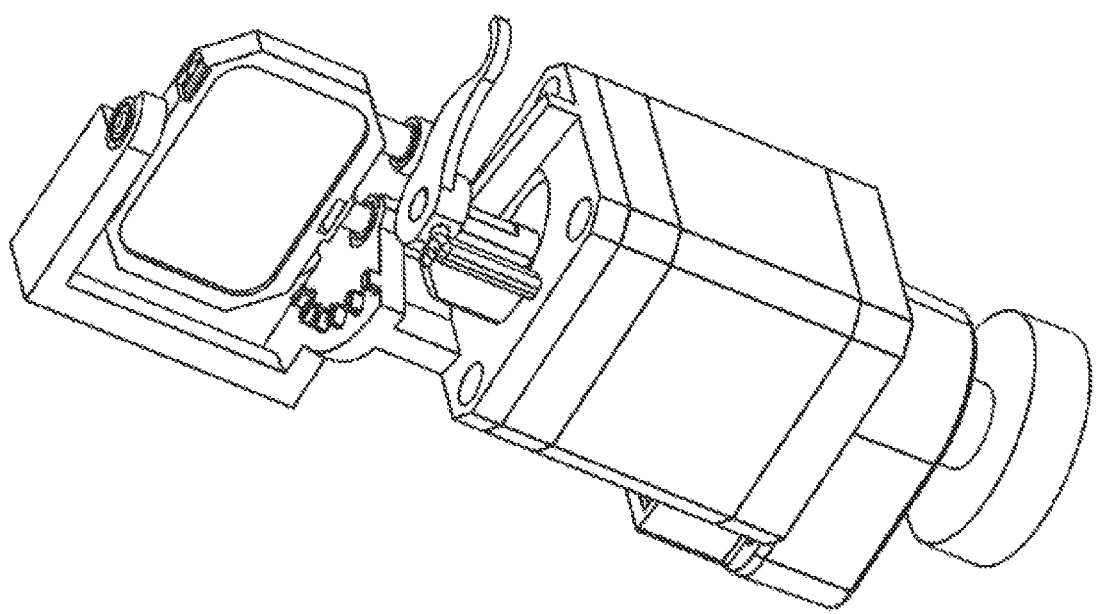
Figure 5E:
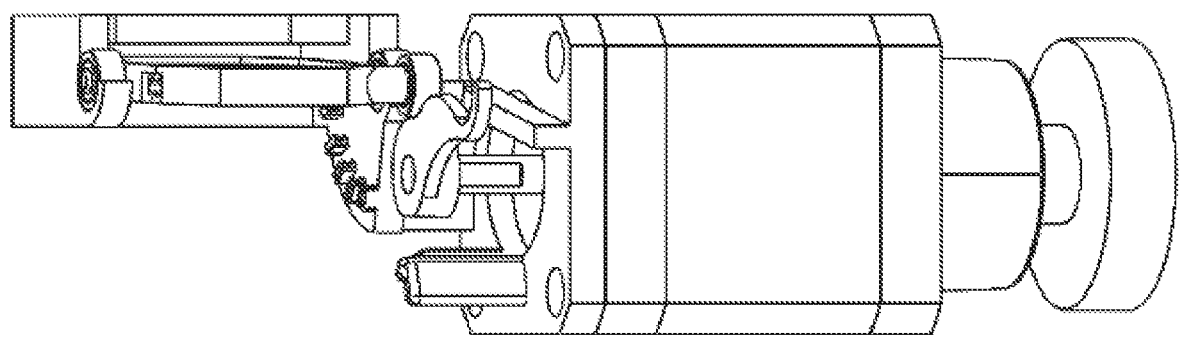
FIGS. 5E-5F show the example spectrum selector in a first position.
Figure 5F:
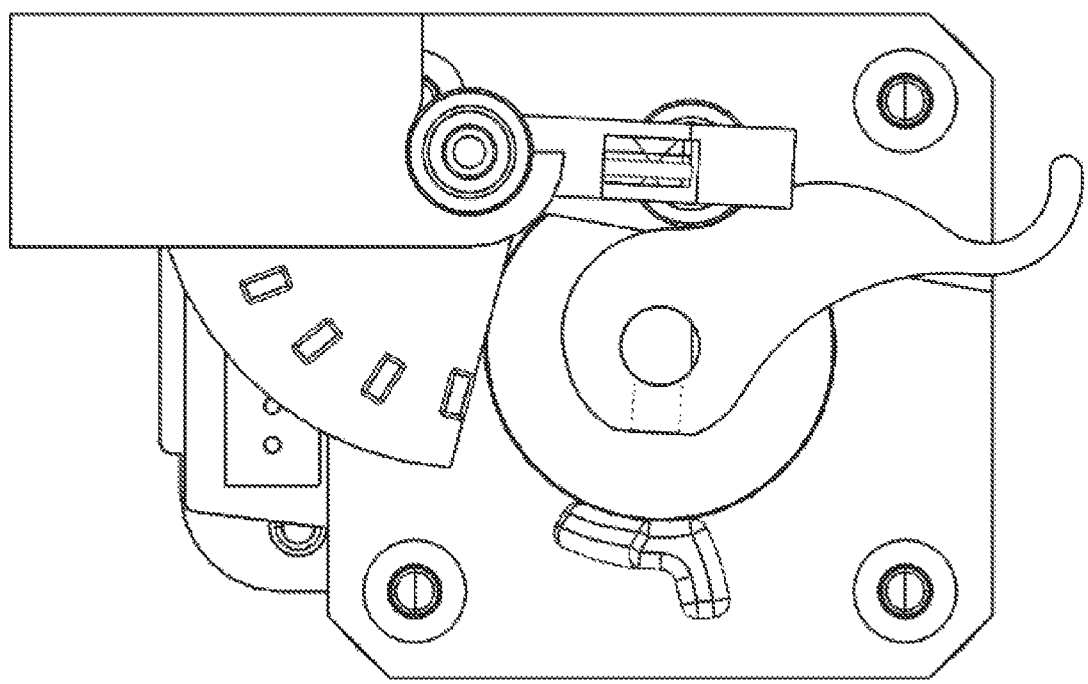
Figure 5G:
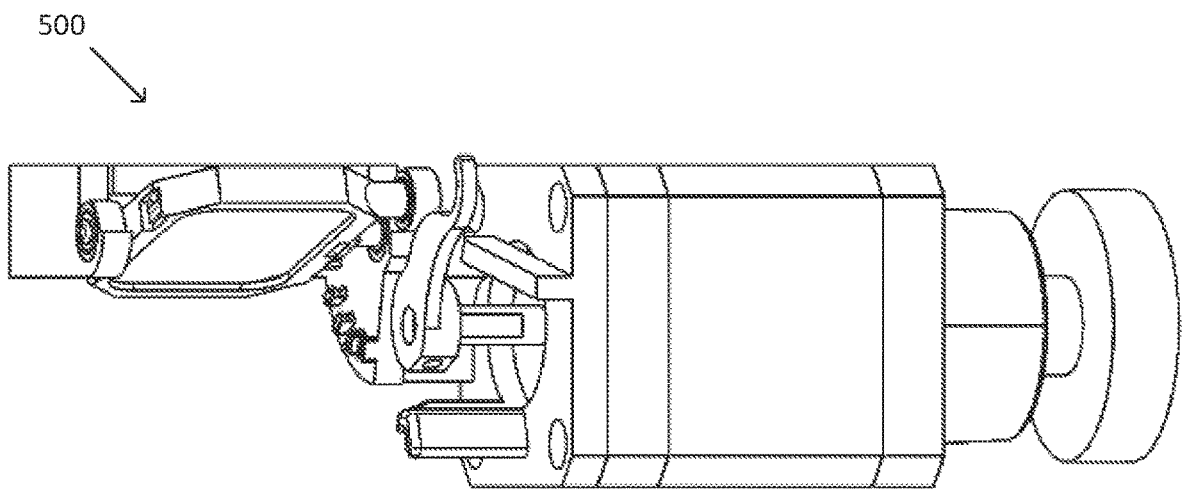
FIGS. 5G-5H show the example spectrum selector in a second position.
Figure 5H:
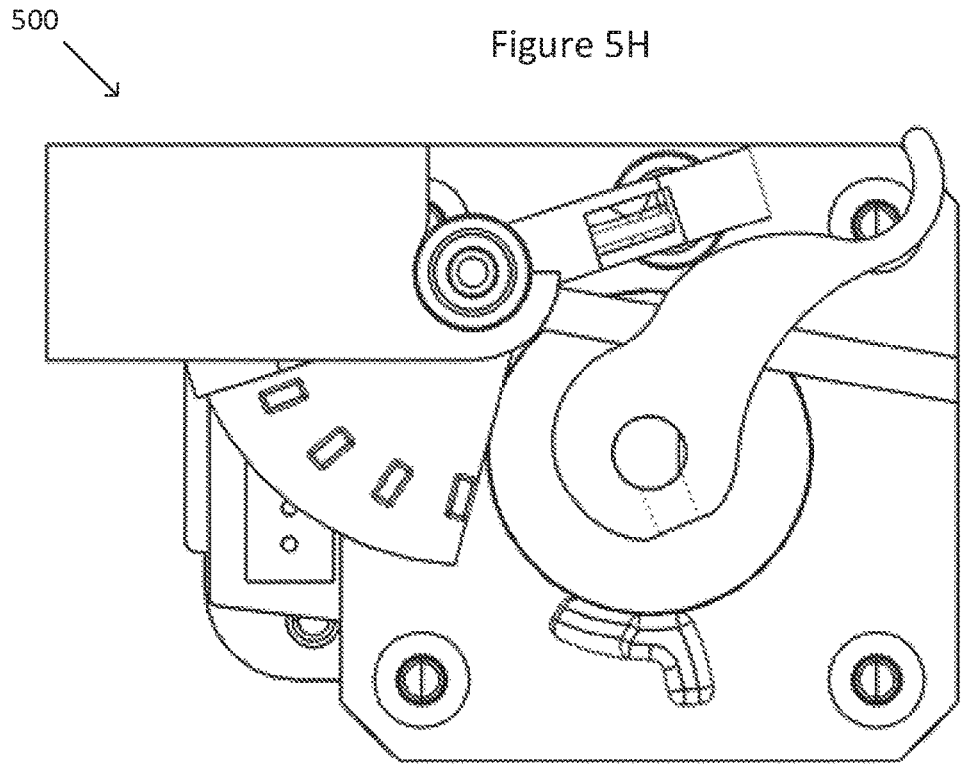

FIGS. 5E-5F show the example spectrum selector 500 in a first position. FIGS. 5G-5H show the example spectrum selector 500 in a second position. To move or rotate the filter 202 from the first position to the second position, the cam 300, which engages at least one of the bearings 212 of the filter assembly 200, rotates or translates due to activation of the motor 502 to which the cam 300 is part of or to which it is adjoined. The rotation or translation of the cam 300 towards the filter assembly 200 causes the engagement surface 308 to engage the filter assembly 200, such that the filter assembly 200 rotates or translates along the one or more bearings 212. To move or rotate the filter 202 from the second position to the first position, the cam 300, which engages at least one of the bearings 212 of the filter assembly 200, rotates or translates due to activation of the motor 502 to which the cam 300 is part of or to which it is adjoined. The rotation or translation of the cam 300 away from the filter assembly 200 causes the filter assembly to contact a different part of the engagement surface 308, thereby changing the height and/or angle of the filter assembly 200. The filter assembly 202, whether due to gravity, a force exerted by the spring 426, or a combination thereof, rotates or translates towards the cam 300. Alternatively, the rotation or translation of the cam 300 away from the filter assembly 200 causes the engagement surface 308 to disengage the filter assembly 200. The filter assembly 202, whether due to gravity, an external force (such as one exerted by the spring 426), or a combination thereof, rotates or translates towards the cam 300.

Though the first and second positions are discussed, the spectrum selector can have any number of desired positions, each position having a different angle of incidence.

Though a single filter assembly 200 is discussed, a filter wheel comprising a plurality of filters and/or filter assemblies can be used. In one embodiment, a plurality of filter assemblies are arranged in a wheel or circular pattern, such that rotation of a wheel motor causes the filter assemblies to rotate around a common axis. Each of the filter assemblies can dock within the adapter 400 for imaging. The wheel motor is then initiated to rotate the filter assembly out and be replaced by another filter assembly. In one embodiment, each filter assembly comprises an adapter, such that no adapter is fixed to the motor, as shown in FIGS. 5A-5H. A plurality of filter assemblies and adapters are arranged in a wheel or circular pattern, such that rotation of a wheel motor causes the filter assemblies and adapters to rotate around a common axis. The adapter can attached to the motor temporarily or can be proximal to the motor such that the cam engages one or more bearings of the filter assembly. The wheel motor is then initiated to rotate the filter assembly and adapter away from the motor and be replaced with another filter assembly and adapter. one or more additional filter assemblies. In one embodiment, each additional filter assembly comprises a filter, wherein no two filters have the same bandpass profiles. In one embodiment, each additional filter assembly comprises a filter, wherein at least two filters have the same bandpass profiles.

As noted above, changing the angle of incidence allows for the selection of emission/excitation wavelengths to obtain a variety of images acrossing a plurality of emission/excitation wavelengths, such as when two or more detection moieties have overlapping spectra. For example, in one embodiment, the detection moieties can have differences in spectra at their peaks of less than or equal to 50 nm. In one embodiment the detection moieties can have differences in spectra at their peaks of less than or equal to 10 nm. In one embodiment, the detection moieties can have differences in spectra at their peaks of 1-50 nm. In one embodiment, the detection moieties can have differences in spectra at their peaks of 10-50 nm. In one embodiment, the detection moieties can have differences in spectra at their peaks of 1, 2, 3, 4, 5, 6, 7, 8, 9, 10, 11, 12, 15, 20, 25, 30, 40, 50, 60, 70, 75, 80, 90, or 100 nm. In one embodiment, the difference between successive spectra (such as at the peak) can be the same (e.g., first and second detection moieties are separated by 10 nm and second and third detection moieties are separated by 10 nm). In one embodiment, the differences between successive spectra (such as at the peak) can be different (e.g., first and second detection moieties are separated by 10 nm and second and third detection moieties are separated by 25 nm).

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "adjoined," "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents:

What is claimed is:

1. A system, comprising:
   a first filter assembly comprising
      a first filter, a base, a retainer, and two or more bearings, wherein the first filter is retained between the base and the retainer, wherein a first side of the base comprises one or more bearings, and wherein an opposing second side of the base comprises one or more bearings; and
   a cam,
   wherein the cam is configured to contact at least one bearing of the first filter assembly and to rotate the first filter assembly from a first position to a second position.

2. The system of claim 1, wherein the first position of the first filter assembly provides a first angle of incidence of a light on the first filter, and wherein the second position of the first filter assembly provides a second angle of incidence of the light on the first filter.

3. The system of claim 2, wherein the first angle of incidence of the light on the first filter ranges from 0° to 89.9°, and the second angle of incidence of the light on the first filter ranges from 0° to 89.9°.

4. The system of claim 2, wherein the first and second angles of incidence of the light on the first filter are selected from any angle of incidence ranging from approximately 5° to 60°, and wherein the first and second angles of incidence of the light on the first filter are not equal.

5. The system of claim 1, further comprising a motor adjoined to the cam.

6. The system of claim 1, wherein the base and the retainer each comprise a main body and one or more protuberances extending from the main body towards the first filter.

7. The system of claim 5, further comprising an adapter comprising a motor segment and a filter segment, wherein the adapter is adjoined to the motor.

8. The system of claim 7, wherein the motor segment comprises a main body comprising a spindle bore through which a spindle of the motor can be inserted.

9. The system of claim 8, wherein the motor segment further comprises a stop projecting in direction away from the motor to inhibit rotation or movement of the cam beyond a certain point.

10. The system of claim 7, wherein the filter segment comprises a stanchion adjoined to a first arm and a second arm, and wherein the first and second arms each include at least one cut-out being sized and shaped to receive at least one bearing of the filter assembly.

11. The system of claim 10, wherein the stanchion comprises a stopper to set a travel limit on the filter assembly.

12. The system of claim 11, wherein the stopper is a screw, rod, dowel, post, spring, overhang, or combinations thereof.

13. The system of claim 1, further comprising one or more additional filter assemblies, wherein each additional filter assembly comprises a filter.

14. The system of claim 13, wherein no two filters have the same bandpass profiles.

15. The system of claim 13, wherein at least two filters have the same bandpass profiles.

* * * * *